April 29, 1958 J. D. BLAKELEY ET AL 2,832,539
SLIDE RULES
Filed June 4, 1954 3 Sheets-Sheet 1

INVENTORS:
JOHN DYSON BLAKELEY AND
SIDNEY RADCLIFFE POTTER
BY:

April 29, 1958 J. D. BLAKELEY ET AL 2,832,539
SLIDE RULES

Filed June 4, 1954 3 Sheets-Sheet 2

INVENTORS:
JOHN DYSON BLAKELEY AND
SIDNEY RADCLIFFE POTTER
BY:

April 29, 1958  J. D. BLAKELEY ET AL  2,832,539
SLIDE RULES

Filed June 4, 1954  3 Sheets-Sheet 3

INVENTORS:
JOHN DYSON BLAKELEY AND
SIDNEY RADCLIFFE POTTER
BY:

United States Patent Office 2,832,539
Patented Apr. 29, 1958

2,832,539

SLIDE RULES

John Dyson Blakeley, London, and Sidney Radcliffe Potter, Dukinfield, England

Application June 4, 1954, Serial No. 434,532

Claims priority, application Great Britain June 4, 1953

5 Claims. (Cl. 235—70)

This invention concerns slide rules.

In relation to many trades and arts there exist numerous formulae of substantial complexity which require frequent evaluation. One such formula, which is much used in the heat insulating art is $$q = \frac{ts_1 - tm}{\frac{d_1}{2k} \log_e \frac{d_2}{d_1} + \left(\frac{d_1}{d_2} \times \frac{1}{f}\right)}$$

where
$q$ = heat loss through insulating material covering a pipe or the like of circular cross-section in B. t. u.'s/square foot of hot surface/hour
$ts_1$ = temperature of hot surface in ° F.
$tm$ = temperature of ambient air in ° F.
$d_1$ = outside diameter of pipe in inches
$d_2$ = outside diameter of insulating material on pipe in inches
$k$ = thermal conductivity of insulating material in B. t. u.'s/square foot/hour/° F./inch thickness
$f$ = surface co-efficient in B. t. u.'s/square foot/hour/° F.

A further formula used in the same art is $$q = \frac{ts_1 - tm}{\frac{z}{k} + \frac{1}{f}}$$

where
$q$ = heat loss through insulating material covering flat surface in B. t. u.'s/square foot of hot surface/hour
$z$ = thickness of insulating material in inches, and the remaining symbols have the same significance as in the first-mentioned formula.

The object of the present invention is to provide a slide rule calculator adapted for the evaluation of mixed formulae in general and of these two formulae in particular.

According to the present invention a slide rule calculator especially adapted for evaluating a mixed formula is characterised by a plurality of groups of scales and slides, each group being arranged for the evaluation of a part of or a simplification of the formula.

By "mixed" formula is meant a formula which cannot be evaluated by continuous manipulation of an ordinary logarithmic slide rule, for instance a formula including addition and subtraction steps.

Figure 1:
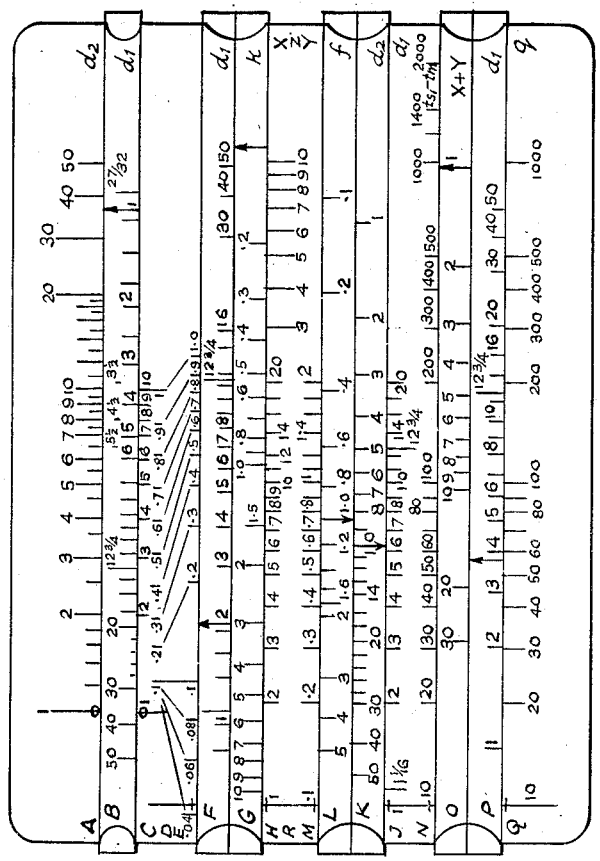
Figure 2:
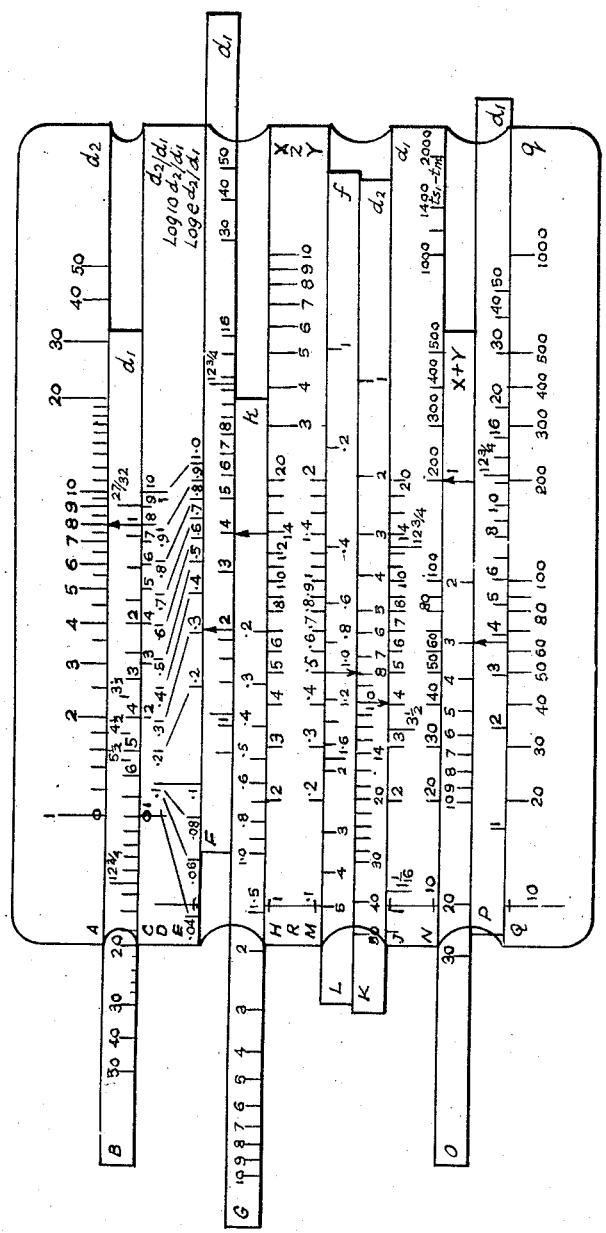
Figure 3:
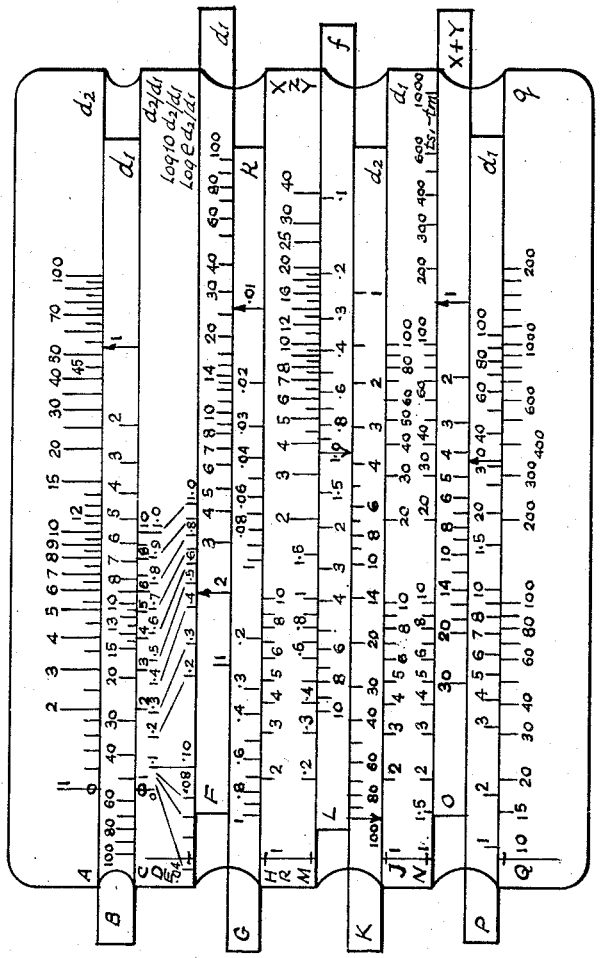

The invention will now be described further, by way of example, with reference to the accompanying drawings in which:

Fig. 1 is a view of one form of rule when not in use;
Fig. 2 shows the rule illustrated in Fig. 1 as used to evaluate $q$ under certain conditions, and
Fig. 3 illustrates another form of rule when not in use.

The rules illustrated in the drawings each consist of a stiff base, for example of highly compressed cardboard, on which are marked ten scales (A, C, D, E, H, R, M, J, N and Q); seven slides, each marked with a further scale (B, F, G, L, K, O and P respectively), and accommodated in grooves in the base, one groove between the A and C scales carrying the slide marked with scale B, one groove between the E and H scales carrying the slides marked with the F and G scales, one groove between the M and J scales carrying the slides marked with the L and K scales, and one groove between the N and Q scales carrying the slides marked with the O and P scales; and a transparent facing, for instance of methyl methacrylate, riveted to the base. When the rule is assembled the slides are capable of accurate longitudinal movement relative to the base under manual endwise pressure. The scales are all either logarithmic or bear a logarithmic relationship to another scale and their nature will be clearly understood from the following description of the operation of the rule illustrated in Figs. 1 and 2 of the accompanying drawings.

In order to evaluate $q$ from the formula $$q = \frac{ts_1 - tm}{\frac{d_1}{2k} \log_e \frac{d_2}{d_1} + \left(\frac{d_1}{d_2} \times \frac{1}{f}\right)}$$

the rule is manipulated as follows:

(a) Adjust the arrow on the B scale to correspond with the value of $d_2$ on the A scale and opposite the value of $d_1$ on the B scale read off the value on the C scale. Since all the scales on the moving slides are based on logarithmic measurement, it is necessary to locate the arrow at the figure of unity; a simple addition or subtraction of two adjacent scales will then represent multiplication or division respectively, provided that the arithmetic measurement between 1 and 10, and between 10 and 100 is the same in each case. The arrow on scale B is at unity and the whole scale is marked out with the reciprocals of the logarithmic values, so that simple addition of the scales represents division, i. e. $d_2/d_1$.

Since the A scale is a logarithmic scale calibrated from 1 to 50, the B scale is a reversed logarithmic scale of like units calibrated from 1 to 50 (the arrow being at 1) with additional fractional values for convenience, and the C scale is an aligned repeat of the A scale over the range 1 to 10, this first manipulation gives a reading of the value $$\frac{d_2}{d_1}$$

on the C scale.

To proceed, read the value on the D scale vertically beneath this value of $$\frac{d_2}{d_1}$$

on the C scale and follow across to the E scale with the aid of the inclined guide lines. Place the arrow on the F scale opposite the indicated position on the E scale. Place the arrow of the G scale against the value of $d_1$ on the F scale and read the value on the H scale which corresponds to the value of K on the G scale. The arrow of scale F again is at logarithmic unity but, as all this scale represents $d_1/d_2$, the arrow is located at the physical number 2, and all the other marks are at the logarithmic position for half the value of the figure for $d_1$ which appears on the scale. Scale F multiplies by $d_1/2$ and scale G multiplies by $1/k$.

The D scale is a linear one corresponding to the logarithmic C scale and the E scale is a logarithmic scale of like units to those of the C scale but displaced from the H scale (on which the result is to be read) by the Napierian constant 2.302. The F scale is as the B scale (but not reversed) with an arrow at 2; the G scale is a reversed logarithmic scale of like units to those of the F scale but calibrated from 1 to 10 (i. e. of greater extent); and the H scale logarithmic to like units as those of the G scale, the left hand part being calibrated from 1 to 20 and the right hand part from 2 to 10 (the significance of which right hand part will later be apparent). It will therefore be clear that the operations described will effect, with reference to the H scale, the conversion of $$\frac{d_2}{d_1} \text{ to } \log \frac{d_2}{d_1} \text{ (actual value)}$$

followed by the correct location of this value relative to the scale of reference to enable by usual process of logarithmic addition and subtraction, the value of $$\frac{d_1}{2k} \log_e \frac{d_2}{d_1}$$

to be indicated on the H scale.

This value is conveniently designated X.

(b) Place the arrow of the K scale opposite the value of $d_1$ on the J scale, place the arrow of the L scale opposite the value of $d_2$ on the K scale and read the value on the M scale which corresponds with the value of $f$ on the L scale.

The M, L, K and J scales are all logarithmic to like units, the L and K scales being reversed. The M scale is numbered from 0.1 to 2, the L scale from 0.1 to 5 (arrow at 1.0), the K scale from 1 to 50 (arrow at 10), and the J scale from 1 to 50 and, like the F scale has convenient fractions marked. The operations described therefore, by normal logarithmic processes, give a value on the M scale of $$\frac{d_1}{d_2} \times \frac{1}{f}$$

This value is conveniently designated Y.

(c) Add X and Y together.

Place the arrow of the O scale opposite the value of $(ts_1-tm)$ on the N scale. Then place the arrow of the P scale opposite the value of $(X+Y)$ on the O scale. Then read the value on the Q scale indicated by the lower end of the arrow of the P scale. Alternatively read the value on the Q scale opposite the value of $d_1$ on the P scale.

The N and Q scales are like (but the former is of somewhat greater extent) being logarithmic scales calibrated from 10 to 2000 and 10 to 1000 respectively. The O scale is a reversed logarithmic scale of like units numbered from 1 to 30 (arrow at 1) and the P scale is a repeat of the F scale.

This final operation, therefore, will give, by usual logarithmic processes the value of $q$.

The arrow of the P scale is at 3.82 (i. e. $12/\pi$) and therefore the alternative reading on the P scale will give the heat loss per foot length of pipe instead of per square foot of surface. The arrow on scale P is located at $12/\pi$ because a pipe of $12/\pi$ inches diameter 1 foot long has a surface area of 1 square foot. This arrow, as with the other scales, therefore, is located at the effective unity.

The temperature on the outer surface of the insulation may be found from the formula $$ts_2 = q.Y + tm$$

where $ts_2$ is the temperature of the outer surface of the insulation in ° F. and the other symbols are as indicated previously.

Scale P, although it is marked in terms of inches diameter, really is based on a logarithmic scale of the values for the number of square feet per linear foot of pipes of different diameters, i. e. it is marked out in accordance with the logarithmic values of $\pi d$, in this case $d_1$ being converted to feet for the purposes of the calculation. Assuming that the value of the heat loss per square foot is ($q$), to determine the corresponding heat loss per linear foot for a pipe of diameter $d_1$, it is necessary to multiply $q$ by $\pi d_1$, converting to feet as necessary. This is done on the rule by setting the tail of the arrow of the P scale opposite to the known value of $q$ on the Q scale; then, opposite to the appropriate mark on the P scale for the diameter of the pipe, is read the required value of the heat loss per linear foot ($q \times \pi d_1$), again read on scale Q. The determination then is a simple addition of two logarithmic values—of $q$ on scale Q and $\pi d_1$ on scale P, with the modification that the values of $\pi d_1$ are converted automatically to feet in order to maintain constant units. When the calculation of heat loss is carried out in terms of a square foot unit, scale P is not required and the arrow on that scale then is used only as a straight line transfer from scale Q to scale O.

To determine this outer surface temperature by means of the rule, place the tail of the arrow of the P scale opposite the value of $q$ (calculated as above) on the Q scale and, opposite the head of this arrow, put the significant figure value of Y (calculated as above) on the O scale. The extension of the 10 mark on the O scale will usually indicate on the N scale the correct value of the difference in temperature between the outer surface of the insulation and the ambient air (this difference is numerically equal to the product $q.Y$) but the significant figure value may be read off at the arrow at 1. The value of $ts_2$ is the sum of this temperature difference and the temperature of the ambient air.

For flat surfaces the corresponding formula for the evaluation of $q$ is $$q = \frac{ts_1 - tm}{\frac{z}{k} + \frac{1}{f}}$$

where the symbols have the same significance as before and $z$=thickness of the insulating material in inches. In order to find the value of $q$ in given circumstances the rule is manipulated as follows.

(a) Place the tail of the arrow of the G scale opposite the value of $z$ on the R scale which is a logarithmic scale co-incident with the H scale but covering values from 1 to 10, and read off the value on the R scale opposite the value of $k$ on the G scale. This value on the R scale is therefore $$\frac{z}{k} = (\text{say}) X_1$$

For multiple layer insulation the value of $X_1$ for each layer can be determined in this way, by inserting the appropriate value of thermal conductivity, and then all the values added together for the final total to be used on the O scale, as described below.

(b) Place the tail of the arrow of the L scale opposite the value 1 on the M scale and read off the value on the M scale opposite the value of $f$ on the L scale. The value on the M scale is therefore $$\frac{1}{f} = (\text{say}) Y_1$$

(c) Add $X_1$ and $Y_1$ together and place the arrow of the O scale opposite the value of $(ts_1-tm)$ on the N scale. Then place the arrow of the P scale opposite the value of $(X_1+Y_1)$ on the O scale. It will then be clear that the value of $q$, the heat loss, may be read off on the Q scale against the lower end of the arrow of the P scale.

The surface temperature can be ascertained in similar manner as described for pipes above.

In order further to explain the working of the rule a numerical example for a pipe of circular cross section will now be given and Fig. 2 shows the rule settings. It is desired to find the heat loss $q$ through the insulating material.

In the example:

$ts_1 = 225°$ F.
$tm = 25°$ F.

$d_1 = 4''$
$d_2 = 8''$
$f = 1.8$ B. t. u.'s/square ft./hour/° F.
$k = .5$ B. t. u.'s/square ft./hour/° F./for one inch thickness (a) Using scales A to H to evaluate $$\frac{d_1}{2k} \log_e \frac{d_2}{d_1} = X$$

The slides are positioned as shown in Fig. 2 which gives the value of X on the H scale as 2.77.

(b) Using scales J to M evaluate $$\frac{d_1}{d_2} \times \frac{1}{f} = Y$$

The slides are positioned as in Fig. 2 which gives the value of Y on the M scale as .278.

(c) $X + Y = 3.048$; $ts_1 - tm = 200$

Using scales N to Q to make the final evaluation of $q$ the answer given on the Q scale is 65.7 B. t. u.'s/square foot/hour. Alternatively the heat loss per foot length is given as 68.9 B. t. u.'s/hour.

Fig. 3 illustrates a metric version of the rule shown in Figs. 1 and 2. The method of manipulation is of course the same.

In the metric rule the units are as follows:

Diameters and thicknesses in centimeters
Thermal conductivity in calories×10³/metre²/hour/° C./metre thickness
Surface co-efficient in calories×10³/metres²/hour/° C.
Temperatures in ° C.
Heat loss in calories×10³/metre²/hour

What we claim is:
1. A slide rule calculator for evaluating $q$ according to the formula

$$q = \frac{ts_1 - tm}{\frac{d_1}{2k} \log_e \frac{d_2}{d_1} + \frac{d_1}{d_2} \times \frac{1}{f}}$$

comprising a first group of stationary scale means and movable slide means for evaluating $$\frac{d_1}{2k} \log_e \frac{d_2}{d_1}$$

a second group of stationary scale means and movable slide means for evaluating $$\frac{d_1}{d_2} \times \frac{1}{f}$$

and a third group of stationary scale means and movable slide means for introducing $ts_1 - tm$ and for obtaining $q$, said groups of stationary scale means and movable slide means being arranged for substituting in said formula the values given by manipulation of said first, second and third groups whereby $q$ is evaluated, which said first group includes a fixed logarithmic scale, marked with a range of $d_2$ values, adjacent the top edge of a first groove, a reversed logarithmic scale, marked with a range of $d_1$ values, on a slide in said groove, a fixed logarithmic scale, marked with a range of $$\frac{d_2}{d_1}$$

values, adjacent the bottom edge of said groove, a fixed linear scale, corresponding to the last mentioned scale, disposed therebelow, a further fixed logarithmic scale adjacent the top edge of a second groove, corresponding values on which are connected with values on the linear scale by guide lines, a logarithmic scale, marked with a range of $d_1$ values, on a first upper, slide in said second groove, a reversed logarithmic scale, marked with a range of $k$ values, on a second lower slide in said second groove, and a fixed logarithmic scale marked with a range of $$\frac{d_1}{2k} \log_e \frac{d_2}{d_1}$$

values, adjacent the bottom edge of said second groove, and positioned relative to said further fixed logarithmic scale adjacent the top edge of the second groove so that the markings of the latter are of values of $$\log_e \frac{d_2}{d_1}$$

relative the markings of the former; and in which said second group of scales and slides includes a fixed logarithmic scale, marked with a range of $d_1$ values, adjacent the bottom edge of a third groove, a reversed logarithmic scale marked with a range of $d_2$ values on a first lower slide in the third groove, a reversed logarithmic scale, marked with a range of $f$ values, on a second, upper, slide in the third groove and a fixed logarithmic scale, marked with a range of $$\frac{d_1}{d_2} \times \frac{1}{f}$$

values, adjacent the top edge of the third groove; and in which said third group of slides and scales includes a fixed logarithmic scale, marked with a range of $ts_1 - tm$ values, adjacent the top edge of a fourth groove, a reversed logarithmic scale, marked with a range of $$\frac{d_1}{2k} \log_e \frac{d_2}{d_1} + \left(\frac{d_1}{d_2} \times \frac{1}{f}\right)$$

values, on a slide in the fourth groove, and a fixed logarithmic scale, marked with a range of $q$ values along the bottom edge of the fourth groove.

2. A slide rule calculator as set forth in claim 1 comprising an additional, lower, slide in said fourth groove, a logarithmic scale thereon being marked with a range of $d_1$ values and a constant whereby values of $q.\pi d_1$ may be read off.

3. A slide rule calculator as set forth in claim 2, for evaluating, in addition, $q$ according to the formula $$q = \frac{ts_1 - tm}{\frac{z}{k} + \frac{1}{f}}$$

comprising a further logarithmic scale, marked with a range of $z$ values, adjacent the bottom edge of said second groove.

4. A slide rule calculator as set forth in claim 1, for evaluating, in addition, $q$ according to the formula $$q = \frac{ts_1 - tm}{\frac{z}{k} + \frac{1}{f}}$$

comprising a further logarithmic scale, marked with a range of $z$ values, adjacent the bottom edge of said second groove, and an additional, lower, slide in said fourth groove, a logarithmic scale thereon being marked with a range of $d_1$ values and a constant whereby values of $q.\pi d_1$ may be read off.

5. A slide rule calculator for evaluating $q$ according to the formula $$q = \frac{ts_1 - tm}{\frac{d_1}{2k} \log_e \frac{d_2}{d_1} + \frac{d_1}{d_2} \times \frac{1}{f}}$$

comprising a first group of stationary scale means and movable slide means for evaluating $$\frac{d_1}{2k} \log_e \frac{d_2}{d_1}$$

a second group of stationary scale means and movable slide means for evaluating $$\frac{d_1}{d_2} \times \frac{1}{f}$$

and a third group of stationary scale means and movable slide means including a scale marked with a range of $ts_1-tm$ values, and a scale marked with a range of $q$ values, said groups of stationary scale means and movable slide means being arranged for substituting in said formula the values given by manipulation of said first, second and third group whereby $q$ is obtained.

References Cited in the file of this patent

UNITED STATES PATENTS 703,437   Merritt _____ July 1, 1902

FOREIGN PATENTS 700,910   Great Britain _____ Dec. 16, 1953

OTHER REFERENCES

"Special Slide Rules," by J. N. Arnold. This comprises Engineering Bulletin No. 32, published in 1933 by Purdue University of Lafayette, Ind. Pages 10–33.